H. WENZEL-SCHMIDT.
INSTRUMENT FOR MEASURING THE TENSION AND THE SOUNDING LENGTH OF STRINGS.
APPLICATION FILED OCT. 7, 1912.
1,113,390. Patented Oct. 13, 1914.
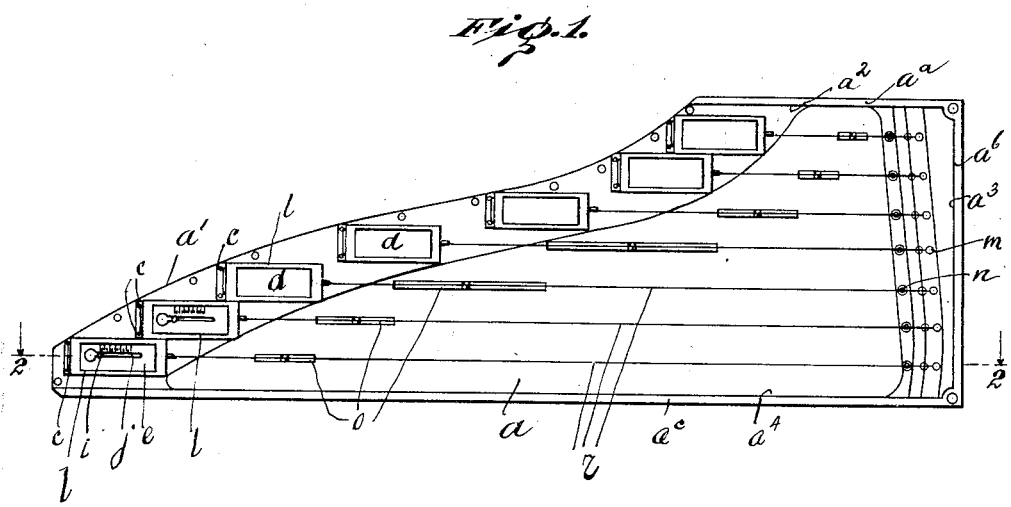
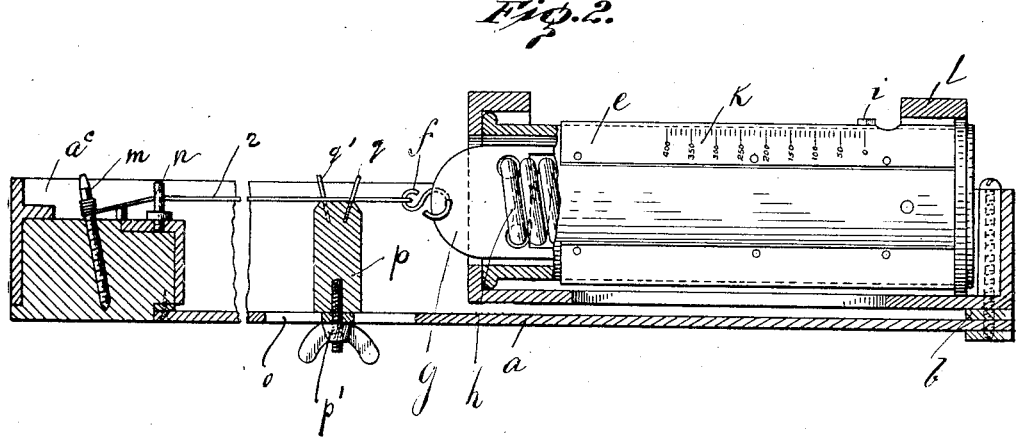

UNITED STATES PATENT OFFICE.

HERMANN WENZEL-SCHMIDT, OF UNIONPORT, NEW YORK.

INSTRUMENT FOR MEASURING THE TENSION AND THE SOUNDING LENGTH OF STRINGS.

1,113,390. Specification of Letters Patent. Patented Oct. 13, 1914.

Application filed October 7, 1912. Serial No. 724,488.

*To all whom it may concern:*

Be it known that I, HERMANN WENZEL-SCHMIDT, residing at Unionport, in the county of New York and State of New York, have invented certain new and useful Improvements in Instruments for Measuring the Tension and the Sounding Length of Strings, of which the following is a specification.

The present invention relates to tension meters for piano strings or the like and has for its object to provide an instrument for determining the tension of piano strings of any length and at any pitch.

With this object in view my invention consists of a grand-piano-like frame work to which are attached a number of piano strings, one end of which is secured to a spring balance and the other end to a tuning-pin. By means of the adjustable individual bridges, the scale draftsman is able to determine the exact length of string that will produce the required tonal and tensional results.

In the accompanying drawing in which similar reference letters denote corresponding parts Figure 1 is a more or less diagrammatic plan view of my instrument and Fig. 2 an enlarged cross section thereof on line 2—2 of Fig. 1.

$a$ denotes a grand piano-like resonant board or plate of the instrument. Along the curved side $a'$ of said plate $a$ a correspondingly-curved upwardly projecting base bar $b$ of substantially square cross section is fixed and along the remaining three straight edges $a^2$, $a^3$ and $a^4$ upwardly projecting flanges $a^a$, $a^b$, and $a^c$ are provided. Fixed on said bar $b$ by screws $c$ or in any other suitable manner are a series of spring balances $d$ of any suitable construction such as used for weighing meat or the like.

In the present embodiment of my invention I have shown each balance to comprise a cylindrical receptacle $e$ in which the hook $f$ carrying member $g$ is movably attached by means of the spring $h$. The said member carries a pointer or finger $i$ which projects outwardly through a longitudinal recess $j$ made in the circumference of the cylinder $e$ and indicates on a longitudinal balance $k$ in pounds or other measures the tension exerted on the member $g$. The cylinder $e$ is suitably and removably mounted in the casing $l$ which as heretofore mentioned is fixed to the bar $b$ by the screws $c$.

The number of balances $d$ comprised in the series corresponds with that of the strings for the different notes of the stringed instrument, *i. e.* there is one for each string.

Fastened in a reinforced or enlarged part of the board or plate $a$ arranged alongside the straight side $a^3$ there is a threaded pin $m$ serving as a tuning pin for each string, which pins are arranged in a line extending in a slant transversely to the plate $a$ and corresponding to that in which the pins are arranged in the stringed instrument for which the strings are designed. In a second substantially parallel line and at a short distance away from the pins $m$ are arranged agraffes $n$ for the corresponding strings. The sounding board or plate $a$ is also provided with a series of longitudinal slots $o$ each arranged between the corresponding scale $d$ and the agraffes $n$. Each slot is adapted to receive a bridge $p$ which is adjustably mounted therein and is capable of being fixed in any of the different positions it may be moved to by means of a thumb nut $p'$ or the like. The slots $o$ vary in length according to the string desired to be determined by this instrument.

By screwing the pin $m$ in or out the board $a$ the string $r$ is caused to wind off or on said pin tensioning accordingly the spring $h$ which tension is indicated on the scale $k$ by the pointer $i$. By the adjustment of the bridge $p$ in the slot $o$ the length measured between the adjusted position of the bridge and the agraffe $n$ is ascertained. Thus after the proper adjustment of the bridge $p$ or the screw pin $m$ or of both the required tonal and tensional results will be obtained. The bridges each are provided in well known manner with two projecting guide pins $q$, $q'$ between which the strings are passed. The strings are each secured at one end to the hook $f$ of the corresponding scale member $g$ and at the other to the corresponding tuning pin $m$. It is the length of the sounding part of the string which extends between the agraffe $n$ and the bridge $p$ and the tension of the string $r$ that are determined, on one hand by reading off the scale *k* and on the other hand by measuring the distance between the bridge and the agraffe.

What I claim and desire to secure by Letters Patent is:

A tension meter for piano strings or the like, comprising a resonant board or plate, a series of adjustable tuning pins at one end of the said board, a series of spring balances at the opposite end thereof, strings each fastened at one end to the corresponding adjustable pin and at the opposite end to the corresponding spring-balance, an agraffe for each string and a series of bridges adjustably mounted in said board one for each string.

In testimony whereof I affix my signature in presence of two witnesses.

HERMANN WENZEL-SCHMIDT.

Witnesses:
 JAMES H. GOGGIN,
 MAX D. ORCHMANN.